United States Patent [19]
Lundgren

[11] 3,786,541
[45] Jan. 22, 1974

[54] CUTTING INSERTS HAVING TWO-STAGE CHIPBREAKER

[75] Inventor: Evert Gustav Lundgren, Sandviken, Sweden

[73] Assignee: Sandvikens Jernveks Aktiebolag, Sandviken, Sweden

[22] Filed: Oct. 18, 1972

[21] Appl. No.: 299,336

[30] Foreign Application Priority Data
Oct. 27, 1971 Sweden.............................. 13605/71

[52] U.S. Cl................................................. 29/95 R
[51] Int. Cl................................................. B26d 1/00
[58] Field of Search.................................. 29/95, 96

[56] References Cited
UNITED STATES PATENTS

| | | | |
|---|---|---|---|
| 3,557,416 | 1/1971 | Jones | 29/95 |
| 3,395,434 | 8/1968 | Wirfelt | 29/95 |
| 3,383,748 | 5/1968 | Galimberti et al. | 29/95 |
| 3,381,349 | 5/1968 | Newcomer | 29/95 |

*Primary Examiner*—Leonidas Vlachos
*Attorney, Agent, or Firm*—Pierce, Scheffler & Parker

[57] ABSTRACT

The invention relates to a cutting insert having chipbreakers in two stages, and is characterized in that the cutting edge and the associated chip-breaker describe a curve composed of straight and/or arched parts in the plane of the clearance- or side face.

6 Claims, 26 Drawing Figures

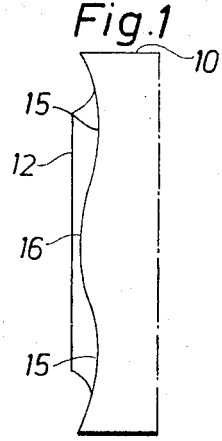
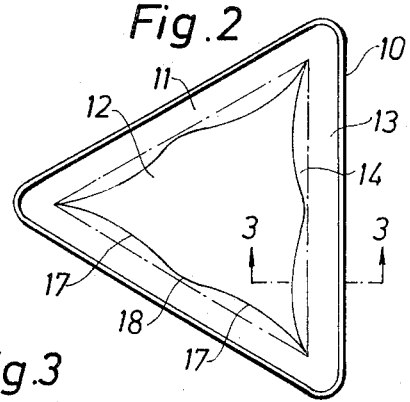
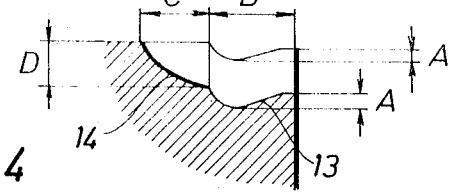
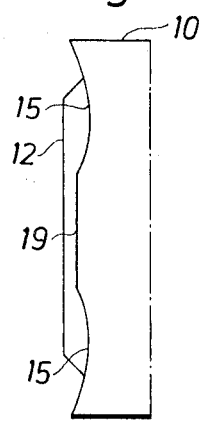
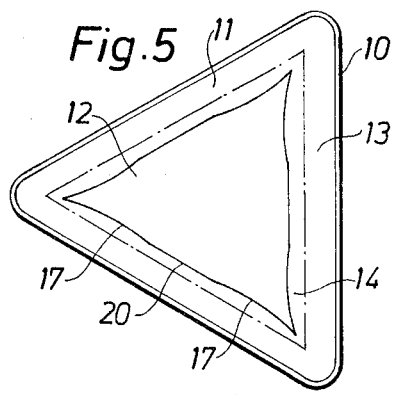
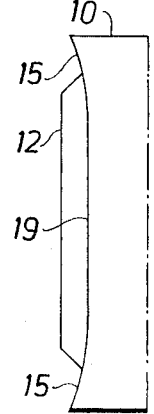
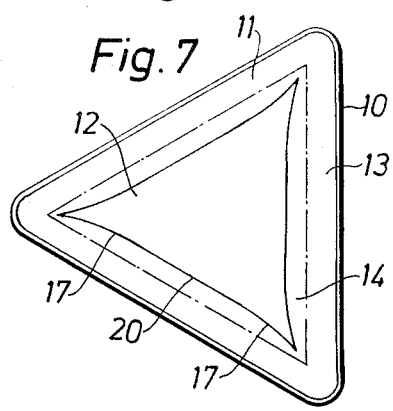

CUTTING INSERTS HAVING TWO-STAGE CHIPBREAKER

The present invention relates to cutting inserts and, in particular, to indexable inserts having at least one cutting edge.

It heretofore had been proposed to provide such inserts with grooves or chip-breakers in the broad sides of chip faces, the grooves extending along the cutting edges. These chip-breakers are shaped in one or more steps.

According to the invention there is now made available a cutting insert giving improved chip-forming and chip-breaking compared to earlier known inserts. The novel cutting insert has shown superior properties under most varying cutting conditions.

The cutting insert of the invention is characterized in that the cutting edge and the associated chip-breaker describe a curve composed of straight and/or arched parts in the plane of the clearance- or side face.

The chip-breaker has two steps or portions. Its back (i.e., inner) boundary connects with a central part of the cutting insert. The invention is characterized in that the first chip-breaker step has constant width and depth in relation to the cutting edge, while the width and depth of the second chip-breaker step vary with the position or depth of the cutting edge in relation to the central part of the cutting insert. In the corner or nose-radius region there may be some divergence from the characteristics of the invention.

In negative inserts which have cutting edges on both sides of the insert, the central parts of the sides are mainly plain or parallel. In single-faced inserts, whether positive or negative in rake, -which have cutting edges only on the top face the central part may have another form.

The present invention will now be described in greater particularity in the following specification taken in connection with the appended drawing, in which:

FIG. 1 is a side elevational view of the cutting insert shown in FIG. 2;

FIG. 2 is a horizontal projection view of a cutting insert according to the invention, showing the top side thereof;

FIG. 3 shows, in enlarged scale, the profile of a chip-breaker on section 3—3 in FIG. 2;

Figure 12:
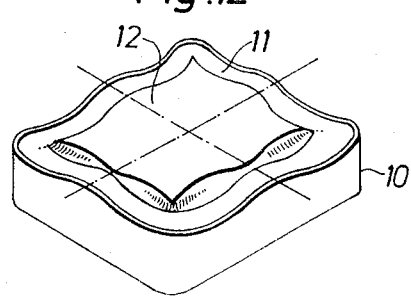
Figure 13:
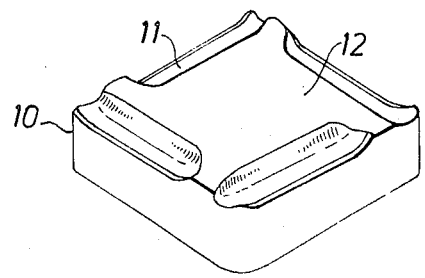
Figure 14:
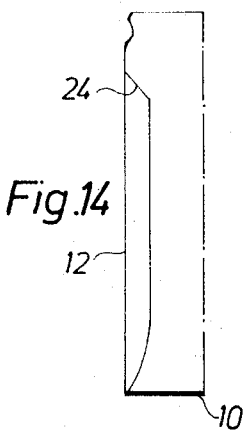
Figure 15:
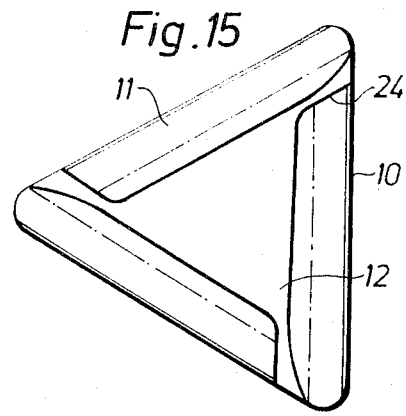
Figure 16:
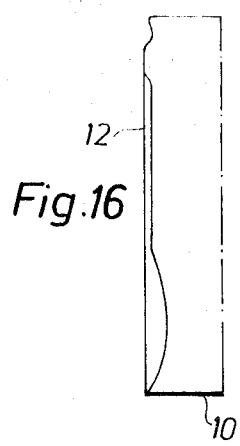
Figure 17:
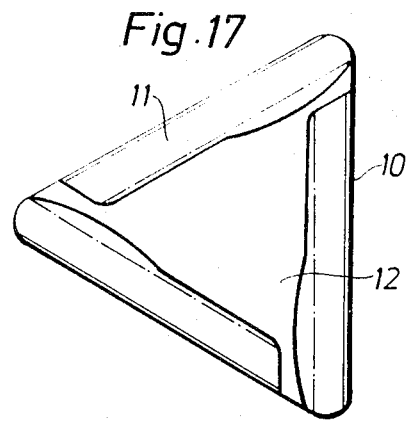
Figure 18:
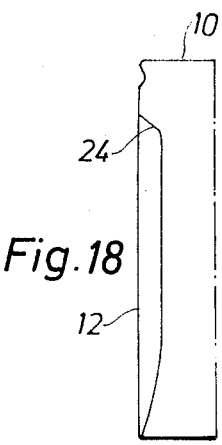
Figure 19:
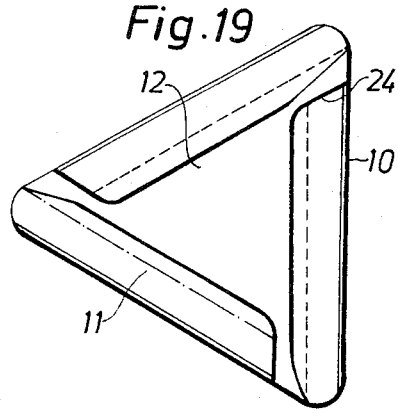
Figure 20:
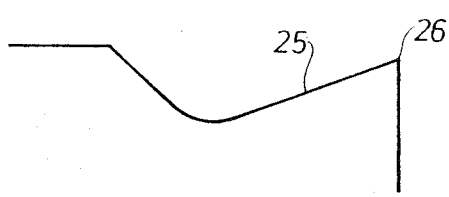
Figure 21:
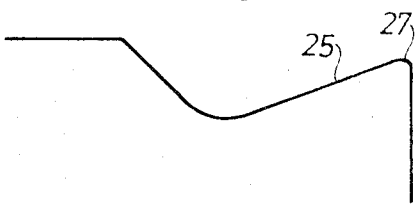
Figure 22:
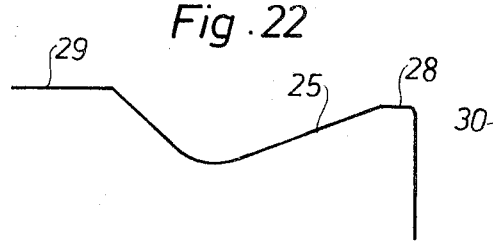
Figure 23:
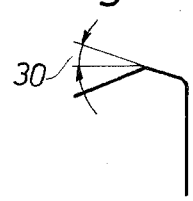
Figure 24:
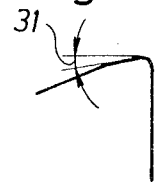
Figure 25:
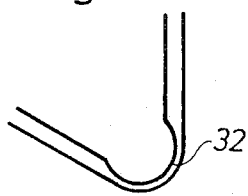
Figure 26:
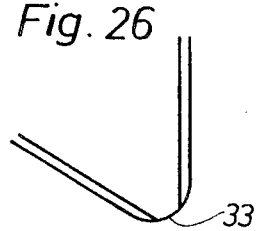

FIGS. 4—11 show side elevational views, respectively horizontal projection views, of different embodiments of cutting inserts according to the invention;

FIGS. 12—13 illustrate a symmetrical, respectively unsymmetrical, square cutting insert according to the invention as seen in perspective;

FIGS. 14—19 show side elevational views, respectively horizontal projection views, of different embodiments of unsymmetrical cutting inserts according to the invention;

FIGS. 20—24 illustrate different forms of connection between chip-breaker and cutting edge; and FIGS. 25—26 show bottom views of different embodiments of cutting insert corners according to the invention.

The cutting insert 10 shown in FIGS. 1—26 has on one broad side (and alternatively also on the opposite side) at least one corner with one or two connecting cutting edges. Along the cutting edges there are chip-breakers in the form of grooves 11 surrounding a central part 12 of the cutting insert. As had been mentioned earlier, the cutting edge is formed so that it describes a curve composed of straight and/or arched parts in the plane of the clearance- or side faces. The chip-breaker has two steps, the first step 13 having constant width B and constant depth A (see FIG. 3) in relation to the cutting edge, while the width C and the depth D of the second chip-breaker step vary with the depth of the cutting edge below the central part 12.

In the embodiment shown in FIGS. 1 and 2, the cutting edge consists of two concave parts 15 next to the corner-radii of the insert, and an interjacent convex part 16. The boundary between the second chip-breaker step and the central face 12 shows corresponding concave parts 17 and a convex part 18.

According to the embodiment shown in FIGS. 4 and 5 the interjacent part 19 (and corresponding chip-breaker part 20) are straight.

FIGS. 6 and 7 show an embodiment in which the interjacent straight part 19 (respectively 20) connects with, and touches, the adjacent concave parts at their lowest point.

Figure 8:
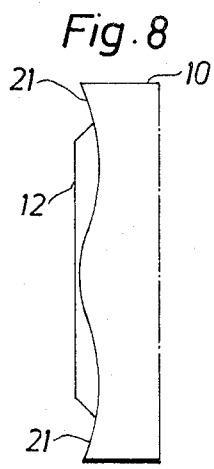
Figure 9:
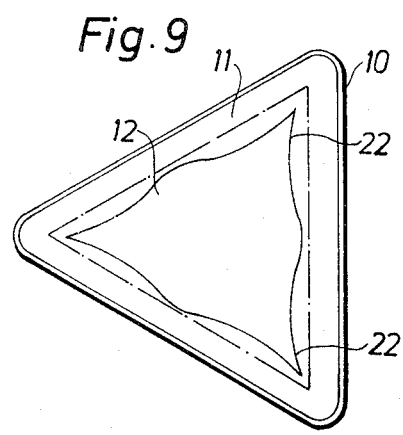

FIGS. 8 and 9 show an embodiment in which the outer portions 21 (respectively 22) of the concave parts are straight towards the insert corners.

Figure 10:
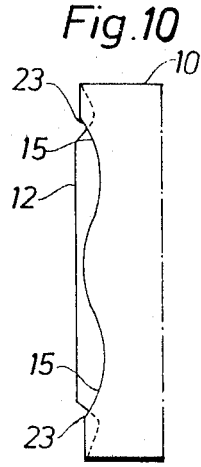
Figure 11:
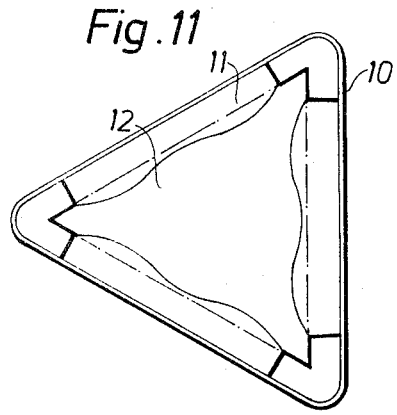

FIGS. 10 and 11 show an embodiment in which the downward part 15 of the cutting edge does not start at the insert corners but rather it starts at some distance 23 into the cutting edge. This form may be present in all embodiments mentioned.

In triangular cutting inserts and in the square cutting insert shown in FIG. 12, the insert is symmetrical, the cutting edges and chip-breakers extending along all the sides and corners of the insert. In this embodiment, also, the cutting edges and the connecting chip-breakers are symmetrically formed in relation to the central lines of the inserts.

FIG. 13 shows an embodiment in which the cutting edges do not extend around the sides of the whole insert and do not follow the shape of the insert corner but rather go straight out through the adjacent insert face.

Relative to the unsymmetrical cutting inserts shown in FIGS. 14–19 the cutting edge and the chip-breaker, from the insert corner and along the primary cutting edge to about the middle or somewhat above the middle of the insert have the same form as in the corresponding region of symmetrical inserts. In the unsymmetrical inserts, the chip-breaker and the cutting edge are finished off by a part 24 connecting to the top face of the cutting insert.

FIGS. 20–24 illustrate examples showing the connection between chip-breaker and cutting edge. Thus, the front edge 25 of the chip-breaker can directly connect with the cutting edge 26, 27 which may be sharp (see FIG. 20), or slightly rounded (see FIG. 21). The front edge may also be connected with the cutting edge via a plain face or land area 28. This plain face can be parallel with the top face 29, respectively, bottom face of the insert, or may incline in negative angle 30 or positive angle 31.

As shown in FIGS. 25–26, such plain face can be thinner in the region 32 around the nose-radius, or be completely missing in this area 33.

Depending upon the depth of the cutting edge below the central part of the cutting insert, different amounts of the profile will be in the chip-breaker cross-section. FIG. 3 shows a border-line case in which the chipbreaker has only one step on its thinnest part but on the broader parts has two steps. It is realized that the composite cross-section of the chip-breaker groove will vary and be different in different cross-sections of the cutting edge.

I claim:

1. Cutting insert having at least one insert corner with associated cutting edges provided with chip-breakers in the shape of grooves in the broad- or chip faces of the insert, said grooves extending along the cutting edges, the inner or back boundary of the chip-breaker connecting with a central region of the cutting insert, said chip-breaker being shaped with two steps, in which cutting insert the cutting edge with associated chip-breaker describes a compound line composed of concave portions adjacent the outer extremities of the cutting edge and an intermediate portion which is arched, said compound line being in the plane of the clearance or side face, the first chip-breaker step having constant width and depth in relation to the cutting edge, while the width and depth of the second chip-breaker step vary with the position of the cutting edge in relation to the central region.

2. Cutting insert according to claim 1, charcterized in that the cutting edge with connecting chip-breaker consists of concave parts next to the corner radii of the insert and an interjacent convex part.

3. Cutting insert according to claim 1, wherein the cutting edges with associated chip-breaker consists of concave parts next to the corner radii of the insert and an interjacent straight part.

4. Cutting insert according to claim 1, wherein the outer portion of the concave parts is straight.

5. Cutting insert according to claim 1, wherein the downward part of the cutting edge starts at some distance into the cutting edge.

6. Cutting edge according to claim 1, wherein the curve which describes the cutting edge with associated chip-breaker extends from the insert corner at least to the middle of the cutting insert.

* * * * *

UNITED STATES PATENT OFFICE
CERTIFICATE OF CORRECTION

Patent No. 3,786,541         Dated January 22, 1974

Inventor(s) Evert Gustav Lundgren

It is certified that error appears in the above-identified patent and that said Letters Patent are hereby corrected as shown below:

[73] Assignee: Sandvik Aktiebolag,
Sandviken, Sweden

Signed and sealed this 30th day of April 1974.

(SEAL)
Attest:

EDWARD M. FLETCHER, JR.           C. MARSHALL DANN
Attesting Officer                 Commissioner of Patents